United States Patent [19]

Cretin et al.

[11] 4,340,561
[45] Jul. 20, 1982

[54] PROCESS FOR THE MANUFACTURE OF A HOLDER FOR A DEODORIZING AND DISINFECTING PRODUCT FOR TOILET PANS

[75] Inventors: Bertrand Cretin, Tours; André Godefroy, Neuille-Pont-Pierre, both of France

[73] Assignee: L'Oreal, Paris, France

[21] Appl. No.: 177,813

[22] Filed: Aug. 13, 1980

[30] Foreign Application Priority Data

Aug. 29, 1979 [FR] France ................................ 79 21659

[51] Int. Cl.³ .............................................. B28B 3/06
[52] U.S. Cl. .................................... 264/297; 264/334; 425/556
[58] Field of Search ....................... D23/3; 4/231, 222; 425/556; 422/266; 264/318, 334, 328.1

[56] References Cited

U.S. PATENT DOCUMENTS

| | | | |
|---|---|---|---|
| D. 253,123 | 10/1979 | Jones | 4/231 |
| 3,832,437 | 8/1974 | Taylor | 264/334 |
| 3,957,944 | 5/1976 | Guala | 264/334 |
| 4,005,101 | 1/1977 | Ruch | 264/318 |
| 4,123,495 | 10/1978 | Abey | 264/318 |
| 4,127,632 | 11/1978 | Huger | 264/318 |
| 4,203,172 | 5/1980 | Conclres | 422/266 |
| 4,254,513 | 3/1981 | Cretia | 422/266 |

FOREIGN PATENT DOCUMENTS

| | | | |
|---|---|---|---|
| 1316837 | 12/1963 | France | 264/334 |
| 2162266 | 7/1973 | France . | |
| 2293533 | 7/1976 | France . | |
| 2429877 | 6/1978 | France . | |
| 2024017 | 1/1980 | United Kingdom . | |

OTHER PUBLICATIONS

"Assembling Parts in the Mold" by Pye. Modern Plastics, pp. 90–94, Jul. 1970.

Primary Examiner—Jay H. Woo
Attorney, Agent, or Firm—N. Jerome Rudy

[57] ABSTRACT

A process and apparatus for the manufacture of a deodorant stick holder comprising a perforated cage and a hook for retaining the cage in a toilet pan, the perforated cage itself being formed by two half-cages joined by flanges at their facing open ends. In the method the hook together with a connecting ring, is moulded in one cavity simultaneously with the moulding of one half-cage in another moulding cavity of a single mould. Upon opening of the mould the connecting ring is first displaced axially to snap fit onto the half-cage end flange and the so assembled unit is then stripped from a core of the mould.

4 Claims, 6 Drawing Figures

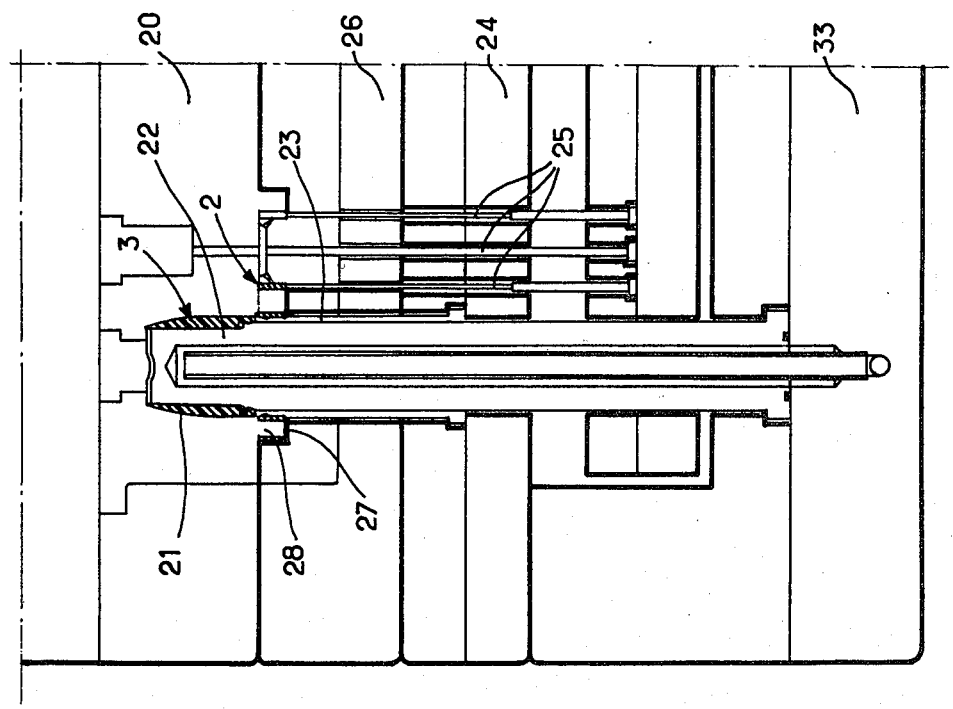
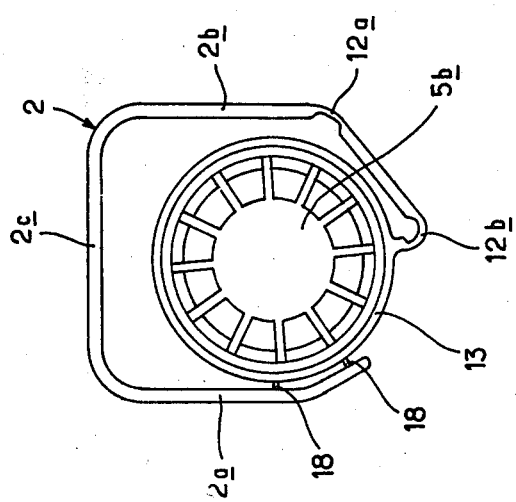
FIG. 3
FIG. 4

PROCESS FOR THE MANUFACTURE OF A HOLDER FOR A DEODORIZING AND DISINFECTING PRODUCT FOR TOILET PANS

This invention relates to the manufacture of a holder having a perforated cage to support a stick of deodorising and disinfecting product in a toilet pan.

It is known that, in order to ensure the disinfection, the cleansing and the deodorisation of toilet pans, sticks of product are used, and these are placed inside a perforated cage which is attached to the rim of the toilet pans by means of a suspension hook.

In the Specification of British Patent Application No. 7,921,305 (with the corresponding disclosure being contained in U.S. Pat. No. 4,254,513) there is described a perforated cage which consists of two moulded half-cages, the suspension hook comprising a connecting ring which snaps onto the two end flanges of the half-cages. One of the two half-cages is moulded with the suspension hook and it is joined to the connecting ring of the latter by means of a tearable fastener. The holder for the deodorising and disinfecting product is assembled by breaking the tearable fastener and then snapping the connecting ring of the hook around the half-cage moulded with the hook. The second half-cage is advantageously assembled by being snapped on simultaneously with the first half-cage and the connecting ring of the suspension hook, which has already been snapped onto the first half-cage.

The object of the present invention is to provide an improvement to the holder described in the abovementioned specification. This improvement consists in manufacturing the first half-cage and the suspension hook in the same mould, but in two separate moulding cavities, the first half-cage and the hook being assembled, without any manual intervention, when the mould is opened and the half-cage has not yet been released from the core of the mould. Thus, since the suspension hook and the first half-cage are moulded separately, they are not joined, as in prior disclosure by a tearable fastener which has to be broken beforehand in order to enable the connecting ring of the hook to be snapped around the first half-cage. This provides two advantages, namely that it is no longer necessary to break the tearable fastener at the time of manufacture, and that the final holder benefits from a better finish.

According to the present invention there is provided a process of manufacturing, by moulding from plastics material, a holder which comprises a perforated cage intended to contain a stick of a deodorising and disinfecting product for toilet pans, and a suspension hook having a connecting ring portion, the perforated cage being comprised of two half-cages each of which has an end flange, the half-cages being joined by their end flanges with the connecting ring of the suspension hook being fixed to the cage by being snapped around at least one half-cage end flange, said method comprising simultaneously injection moulding the suspension hook and one half-cage onto the end flange of which the connecting ring of the hook is to be snapped, the suspension hook and half-cage being injection-moulded in the same mould, but inside two separate moulding cavities, the mould comprising a die and a core engaging within the die to define the moulding cavity for the half-cage, a releasing sleeve surrounding the said core and movable relative thereto for stripping a formed half-cage from the core, a releasing plate cooperable with the die, the moulding cavity for the suspension hook being delimited by the die, the releasing sleeve and the releasing plate, and ejectors for separately displacing the releasing plate and the releasing sleeve relative to the core and for displacing a moulded half-cage/suspension hook unit from the releasing plate, and following moulding the mould is opened, the die is separated from the core, the releasing plate which carries the moulded hook is displaced by at least one of said ejectors parallel to the core axis until the connecting ring of the hook snaps around the end flange of the moulded half-cage carried by the core, the releasing plate and the releasing sleeve are displaced by means of at least one ejector to detach the half-cage/suspension hook unit from the core, and the ejectors are displaced relative to the releasing plate so as to release the half-cage/suspension hook unit from the latter.

In a preferred embodiment, the U-shaped suspension hook is articulated on the connecting ring by means of at least one moulded hinge, the said hinge enabling the suspension hook to rotate, relative to the connecting ring, about an axis parallel to the axis of the said ring; on opening of the mould, the connecting ring is located substantially inside the U-shaped suspension hook, the connecting ring being held inside the U of the hook by means of at least one breakable moulded fastener; the moulded fasteners which hold the connecting ring inside the U of the hook are broken after the holder has been assembled, at the moment when it is hooked onto the rim of a toilet pan.

The present invention also relates to a holder which comprises a perforated cage intended to contain a stick of a product used for disinfecting and deodorising toilet pans, the perforated cage resulting from the assembly of two half-cages which are joined by their end flanges, the perforated cage being associated with a suspension hook integral with a connecting ring which is fixed by being snapped around at least one of the end flanges of the two half-cages, and the abovementioned holder being obtained using the manufacturing process defined above.

In a preferred embodiment, the connecting ring of the suspension hook is fixed by being snapped around each of the two end flanges of the two half-cages; in its internal wall zone, the connecting ring of the hook comprises a peripheral snap-on ring which cooperates with an annular groove provided in the external wall of the end flange of the half-cage which is moulded with the suspension hook; the cage is of approximately cylindrical shape, the assembly plane of the two half-cages being located in the transverse median plane of the cage; the end flange of the half-cage which is not moulded with the hook comprises two concentric skirts, the axis of which approximately coincides with that of the said half-cage in question, namely an external skirt, which projects radially relative to the perforated lateral wall of the half-cage, and an internal skirt, which projects axially relative to the abovementioned external skirt; both the external and internal skirts end in a peripheral ring, the ring of the internal skirt snapping into an annular groove provided inside the end flange of the other half-cage, whilst the ring of the external skirt snaps into an annular groove provided inside the connecting ring of the hook.

A further aspect of the present invention provides apparatus for the manufacture, by moulding from plastics material, of a half-cage and suspension hook for a holder which is intended to contain a stick of a product used for disinfecting and deodorising toilet pans, said apparatus comprising a mould which has two separate moulding cavities, one of which is intended for moulding the suspension hook and its connecting ring, and the other of which is intended for moulding that half-cage having an end flange on which the connecting ring of the hook is to be snapped, the mould comprising a die and a core engaging within the die to define the moulding cavity for the half-cage, a releasing sleeve surrounding the said core and movable relative thereto for stripping a formed half-cage from the core, a releasing plate cooperable with the die, the moulding cavity for the suspension hook being delimited by the die, the releasing sleeve and the releasing plate, and ejectors for separately displacing the releasing plate and the releasing sleeve relative to the core and for displacing a moulded half-cage/suspension hook unit from the releasing plate.

In a preferred embodiment, the core of general cylindrical shape is fixed, it being possible for the die, the releasing plate and the releasing sleeve to be displaced relative to the said core; the moulding cavity of the half-cage possesses an impression provided in the die, the core engaging inside this impression; the annular space between the core and the sunk impression in the die is blocked by the releasing sleeve; the moulding cavity of the suspension hook possesses an annular impression provided at the outlet of the bore in the releasing plate, through which bore the core and the releasing sleeve pass, and an annular projection, which is provided on the die, delimits, together with the abovementioned impression and the releasing sleeve, the moulding cavity of the suspension hook; the releasing sleeve is carried by a plate capable of sliding along the core by means of the ejectors; the releasing plate is capable of sliding relative to the releasing sleeve, under the action of the ejectors; the releasing plate and the releasing sleeve are capable of sliding simultaneously along the core, under the action of the ejectors, and the latter can be displaced relative to the releasing plate in order to release, from the sunk annular impression, the suspension hook which has been snapped onto the half-cage.

The present invention will be further described by way of example, with reference to the accompanying drawing, wherein:

FIG. 3 shows a side view along line III—III of FIG. 1, the suspension hook being shown in the folded position, before breaking of the breakable moulded fasteners which join it to the connecting ring;

Figure 6:
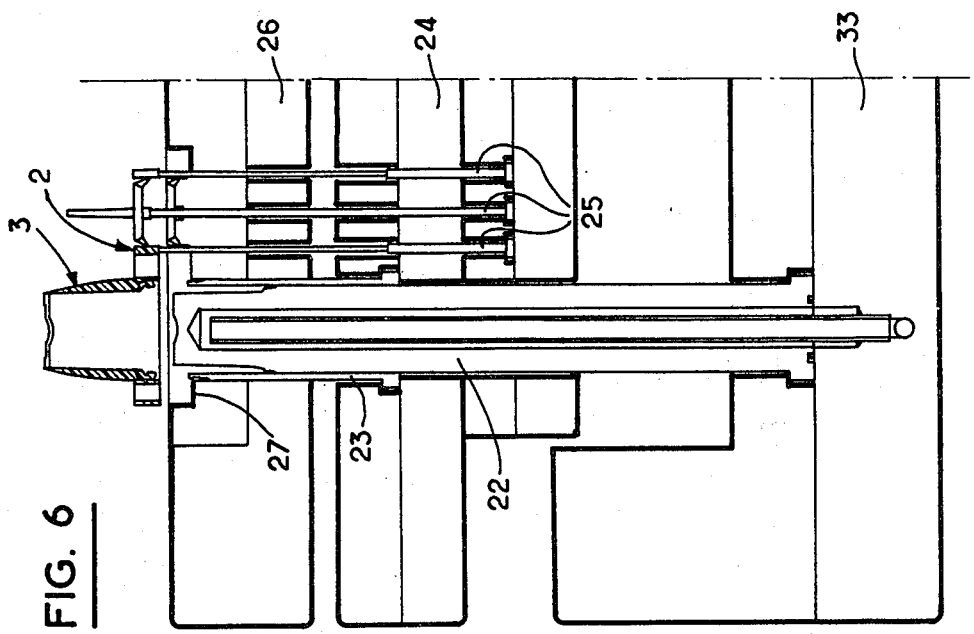
Figure 5:
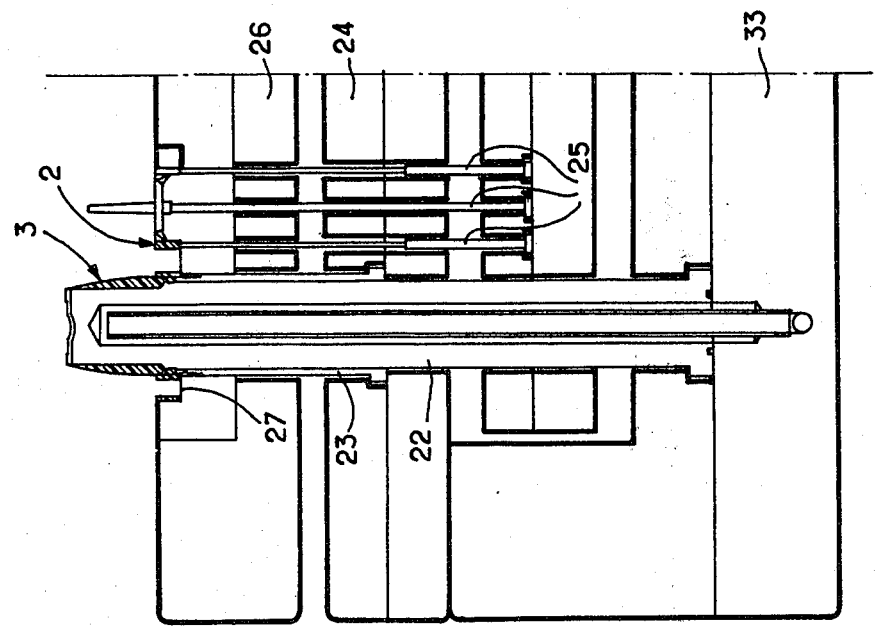

FIG. 4 schematically shows the mould used for the simultaneous production of the suspension hook and the half-cage to which the connecting ring of the hook is initially fitted by snapping-on, the mould being shown in the closed position;

FIG. 5 shows the mould, in a similar view to that of FIG. 4, after the die has been separated from the core of the mould, when the suspension hook is fitted to the half-cage; and FIG. 6 shows the mould of FIGS. 4 and 5 in the open position, after the half-cage/suspension hook unit has been released from the core of the mould.

With reference to the drawing, it is seen that the holder shown consists of a perforated cage 1 intended to contain a stick of a deodorising and disinfecting product, and of a hook 2 making it possible to hang the cage 1 on the rim of a toilet pan. The cage 1 of cylindrical shape results from the assembly of two half-cages 3, 4. Each half-cage 3 and 4 comprises bars 5a parallel to its axis, which are connected at one end to a cage end disc 5b and, in the zone of the transverse median plane of the cage, to a peripheral end flange 6 and 7 respectively. The half-cages are also provided with coaxial circles 5c, which are uniformly spaced apart along the cage and are arranged in planes perpendicular to the cage axis. The two end flanges 6, 7 of the half-cages 3, 4 form an annular shoulder which projects radially outwardly relative to the perforated cylindrical wall of the assembled half-cages.

Figure 1:
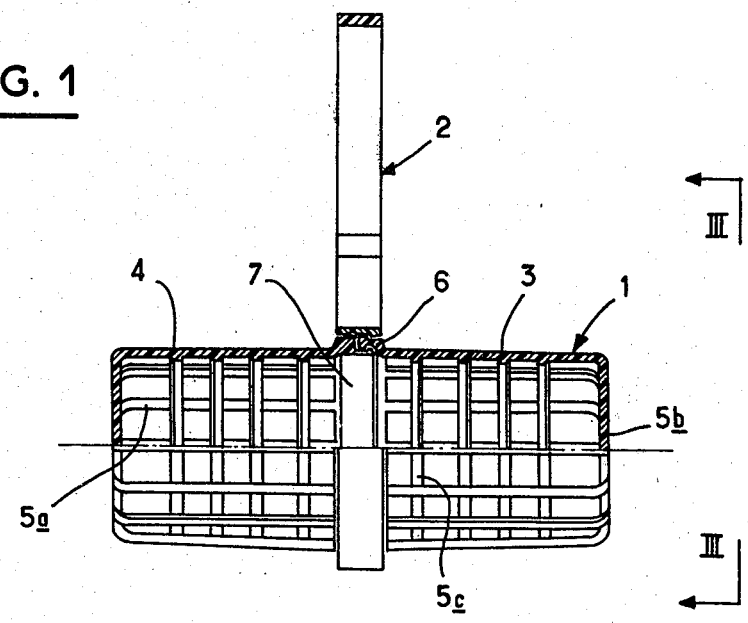
FIG. 1 shows a holder made by the method of the invention, partially in elevation and partially in axial section, after assembly of the two half-cages and the hook, the holder being shown in the form in which it is ready to be hooked onto the rim of a toilet pan.
Figure 2:
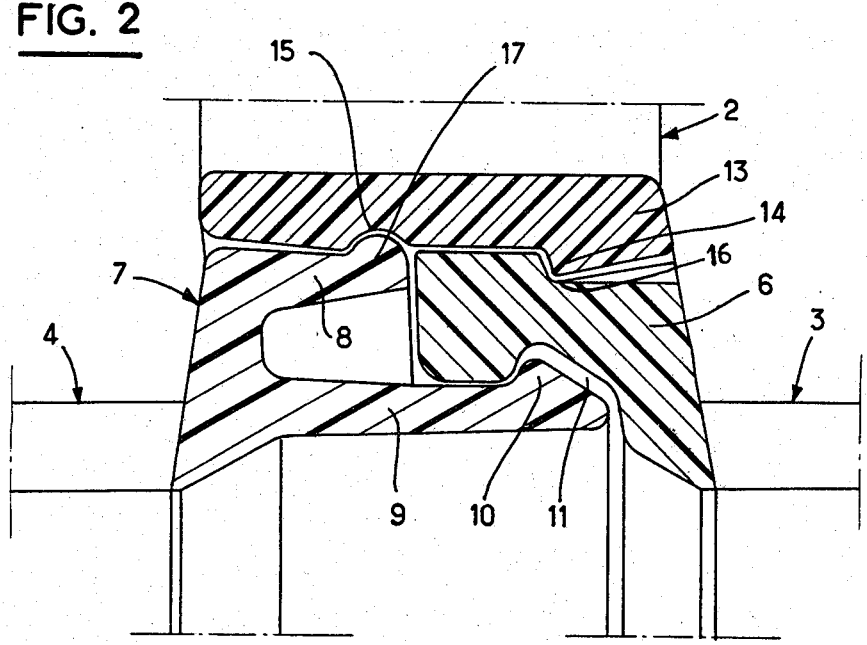
FIG. 2 shows, in axial section and on a larger scale, the manner in which the two half-cages and the connecting ring of the suspension hook are fitted together.

The end flange 7 of the half-cage 4 comprises two concentric skirts 8 and 9 (FIG. 2). The internal skirt 9 is approximately located as an extension of the perforated lateral wall of the half-cage 4 and projects axially relative to the external skirt 8. At its end, the internal skirt 9 carries a peripheral ring 10 which projects radially outwardly from the skirt and which snaps into an annular groove 11 of complementary shape, which is provided in the internal wall of the end flange 6 of the half-cage 3.

The suspension hook 2 possesses a U-shaped part moulded with a connecting ring 13 which is fixed in the central part of the perforated cage. The U of the hook comprises (FIG. 3) two approximately parallel branches 2a, 2b, joined to a crosspiece 2c. The branch 2b of the hook consists of two part-branches joined to one another by means of a hinge 12a; the part-branch which is joined to the connecting ring 13 is connected to the latter by means of a hinge 12b.

FIG. 3 shows the suspension hook in the folded position, in the form in which it is obtained after moulding. The connecting ring 13 is located inside the U of the hook and it is kept inside the latter by means of two tearable fasteners 18, which join the connecting ring 13 to the end branch 2a. To reduce the bulk of the holder, the suspension hook is fitted to the half-cages whilst in the folded position, and it is not until the holder is used on the rim of a toilet pan that the two fasteners 18 are broken so as to release the cage and the associated connecting ring 13 from the U of the hook by pivoting about the hinges 12a, 12b.

On the internal wall of the connecting ring 13, an annular snap-on ring 14 is provided in relief and extends perpendicular to the axis of the connecting ring 13. A peripheral groove 15, which is approximately parallel to the snap-on ring 14, is also provided inside the connecting ring 13. As can be seen clearly in FIG. 2, when the holder is assembled, the connecting ring 13 is arranged around the two end flanges 6 and 7, to which it is fixed by snapping-on; in this position, the snap-on ring 14 cooperates with a groove 16 of complementary shape, provided in the external wall of the end flange 6, whilst a peripheral ring 17, carried by the free end of the external skirt 8, cooperates with the groove 15 in the connecting ring 13. Thus, after assembly, the two half-cages 3 and 4 have not only been snapped onto the internal wall of the connecting ring 13, but they are also directly fixed to one another by snapping-on.

FIGS. 4 to 6 of the drawing show the mould permitting the simultaneous manufacture and also the assembly of the half-cage 3 and the suspension hook 2. This mould comprises a die 20 in which an impression 21 is provided, inside which the half-cage 3 is moulded. A piston or core 22 of general cylindrical shape engages inside the sunk impression 22 and is carried by a plate 33. The core 22 is fixed and the die 20 is displaceable relative to the core. The moulding cavity of the half-cage 3 is delimited not only by the impression 21 and the core 22 which engages inside the said impression, but also by the end of a releasing sleeve 23 arranged around the core 22. The releasing sleeve 23 is used to detach the moulded half-cage 3 from the core 22; the releasing sleeve 23 is carried by a plate 24 which is capable of being slid along the core 22 by means of ejectors 25.

The moulding cavity of the suspension hook 2 is delimited by the die 20, a releasing plate 26 and the releasing sleeve 23. The releasing plate 26 is pierced with a bore which enables it to be inserted around the core 22 and the releasing sleeve 23. On closing the mould, the releasing plate 26 bears on the die 20; it can be displaced parallel to the axis of the core 22 by means of the ejectors 25.

An impression 27 is provided opposite the die 20 at the end of the bore provided in the releasing plate 26; the cross-section of the sunk impression 27 is larger than the cross-section of the bore provided in the releasing plate 26; an annular projection in relief, 28, provided on the die 20, engages inside the impression 27 in the releasing plate 26. The annular projection, 28, is provided around the impression 21 in the half-cage 3.

The moulding cavity of the suspension hook, which hook is manufactured in the position shown in FIG. 3, results from the engagement of the annular projection, 28, on the die 20, inside the impression 27 in the releasing plate 26, this engagement taking place around the releasing sleeve 23 which surrounds the core 22. More precisely, the walls for moulding the connecting ring 13 consist of the internal wall of the annular projection, 28, the peripheral wall of the releasing sleeve 23 and the bottom of the impression 27 in the releasing plate 26; the walls for moulding the U of the hook, folded around the connecting ring 13, are formed by the external peripheral wall of the annular projection, 28, on the die 20, and by the lateral wall of the impression 27 in the releasing plate, 26. The moulding cavities which have now been described, one of which is used for moulding the half-cage 3 and the other for moulding the suspension hook and its connecting ring, are isolated from one another, each moulding cavity having its own supply of plastics material.

The control of the displacement of the releasing plate 26 and of the plate 24 which carries the releasing sleeve 23, by means of the ejectors 25, is carried out in such a way as to permit, on the one hand, the displacement of the releasing plate 26 relative to the sleeve-carrying plate 24 along the core 22, and, on the other hand, the simultaneous sliding of the releasing plate 26 and the sleeve-carrying plate 24 along the core 22. Moreover, the ejectors 25, which are integral with the suspension hook 2 once the latter has been moulded, can be displaced relative to the releasing plate 26 so that the moulded suspension hook can be released from the impression 27 in the releasing plate 26.

The simultaneous moulding of the half-cage 3 and the suspension hook 2 is carried out as follows: the mould is closed, that is to say brought into the position shown in FIG. 4; the releasing plate 26 is then applied against the die 20, and the plate 24, which carries the releasing sleeve 23, bears on the releasing plate 26. The injected plastics is distributed into the two moulding cavities, namely that which is intended for moulding the half-cage 3 and that which is intended for moulding the suspension hook.

After moulding, the die 20 is moved away from the core 22; the moulded half-cage 3 remains attached to the end of the core 22, and the moulded hook 2 also remains inside the impression 27 provided in the releasing plate 26; the ejectors 25 are actuated and push the releasing plate 26 and the moulded hook in the direction of the moulded half-cage 3 until the connecting ring 13 snaps around the end flange of the half-cage 3. The position for the fitting of the suspension hook to the half-cage is shown in FIG. 5.

The ejectors 25 continue their thrust, but, from this moment, they carry along not only the releasing plate 26 but also the plate 24 which carries the releasing sleeve 23. Thus, the half-cage 3/suspension hook 2 unit is simultaneously pushed out of the core 22 by the ejectors 25, which act directly on the suspension hook 2, by the releasing plate 26 and by the releasing sleeve 23, these three pieces being simultaneously displaced.

When the half-cage 3/suspension hook 2 unit has been released from the core 22, the sliding of the releasing plate 26 and the sleeve-carrying plate 24 is stopped and only the displacement of the ejectors 25 is continued, so as to release the moulded unit from the impression 27 in the releasing plate 26. This final position is shown in FIG. 6. It then remains to detach the moulded unit from the ejectors 25.

The perforated holder according to the invention is then assembled in the conventional manner: a stick of a deodorising and disinfecting product is introduced inside the half-cage 3 onto which the suspension hook 2 has been snapped; this unit is then fixed to the half-cage 4 by means of a simultaneous double fixing process (FIG. 2), namely the fitting of the two half-cages to one another by snapping the ring 10 into the internal groove 11, and the fitting of the half-cage 4 to the connecting ring 13 by snapping the ring 17 into the groove 15.

Once it has been assembled, the holder is placed in a leaktight pack for marketing. At the time of use, the user tears open the pack and breaks the fasteners 18 joining the end branch of the hook 2 to the connecting ring 13; the cage and the associated connecting ring are then removed from the U of the hook by pivoting about the hinges 12a, 12b, and the holder is then hooked onto the rim of a toilet pan.

We claim:

1. A process of manufacturing, by moulding from plastics material, a holder which comprises a perforated cage intended to contain a stick of deodorising and disinfecting product for toilet pans, and a suspension hook having a connecting ring portion, the perforated cage being comprised of two half-cages each of which has an end flange, the half-cages being joined by their end flanges with the connecting ring of the suspension hook being fixed to the cage by being snapped around at least one half-cage end flange, said method comprising simultaneously injection moulding the suspension hook and one half-cage onto the end flange of which the connecting ring of the hook is to be snapped, the suspension hook and half-cage being injection-moulded in the same mould, but inside two separate moulding cavities, the mould comprising a die and a core engaging within the die to define the moulding cavity for the half-cage, a releasing sleeve surrounding the said core and movable relative thereto for stripping a formed half-cage from the core, a releasing plate cooperable with the die, the moulding cavity for the suspension hook being delimited by the die, the releasing sleeve and the releasing plate, and ejectors for separately displacing the releasing plate and the releasing sleeve relative to the core and for displacing a moulded half-cage/suspension hook unit from the releasing plate, and following moulding the mould is opened, the die is separated from the core, the releasing plate which carries the moulded hook is displaced by at least one of said ejectors parallel to the core axis until the connecting ring of the hook snaps around the end flange of the moulded half-cage carried by the core, the releasing plate and the releasing sleeve are displaced by means of at least one ejector to detach the half-cage/suspension hook unit from the core, and the ejectors are displaced relative to the releasing plate so as to release the half-cage/suspension hook unit from the latter.

2. A process according to claim 1, wherein the U-shaped suspension hook is moulded to comprise at least one moulded hinge providing an articulated connection to the connecting ring, the said hinge enabling the suspension hook to rotate, relative to the connecting ring, about an axis parallel to the axis of the said ring.

3. A process according to claim 2, wherein upon opening of the mould, the connecting ring is located substantially inside the U-shaped suspension hook and is held inside the U of the hook by means of at least one breakable moulded fastener.

4. A process according to claim 1, wherein the end flange of the other half-cage is joined with a snap fit to the end flange of the one half-cage after provision of a stick of said product therein.

* * * * *